(12) United States Patent
Kwok et al.

(10) Patent No.: US 9,743,054 B2
(45) Date of Patent: Aug. 22, 2017

(54) PROJECTION DEVICE AND FABRICATION METHOD OF A POLARIZATION GRATING

(71) Applicants: The Hong Kong University of Science and Technology, Kowloon (HK); Himax Display, Inc., Tainan (TW)

(72) Inventors: Hoi-Sing Kwok, Kowloon (HK); Li Tan, Kowloon (HK); Yuet-Wing Li, Tainan (TW)

(73) Assignees: The Hong Kong University of Science and Technology, Kowloon (HK); Himax Display, Inc., Tainan (TW)

( * ) Notice: Subject to any disclaimer, the term of this patent is extended or adjusted under 35 U.S.C. 154(b) by 0 days.

(21) Appl. No.: 14/205,382

(22) Filed: Mar. 12, 2014

(65) Prior Publication Data
US 2015/0264327 A1 Sep. 17, 2015

(51) Int. Cl.
*G02F 1/1335* (2006.01)
*H04N 9/31* (2006.01)

(52) U.S. Cl.
CPC ......... *H04N 9/3167* (2013.01); *H04N 9/3164* (2013.01)

(58) Field of Classification Search
CPC .. H04N 5/7441; H04N 9/3102; H04N 9/3108; G02F 2001/13355
USPC ........................................ 349/5, 15
See application file for complete search history.

(56) References Cited

U.S. PATENT DOCUMENTS

| 7,221,420 B2* | 5/2007 | Silverstein ........... G02B 5/3058 348/E9.027 |
|---|---|---|
| 2006/0203164 A1 | 9/2006 | Silverstein et al. |
| 2008/0266662 A1 | 10/2008 | Perkins |
| 2010/0110385 A1 | 5/2010 | Choi et al. |

(Continued)

FOREIGN PATENT DOCUMENTS

| CN | 1440515 | 9/2003 |
|---|---|---|
| CN | 101339335 | 1/2009 |

(Continued)

OTHER PUBLICATIONS

"Office Action of Taiwan Counterpart Application", issued on Jan. 25, 2016, p. 1-p. 7.

(Continued)

*Primary Examiner* — Nathanael R Briggs
(74) *Attorney, Agent, or Firm* — J.C. Patents (57) ABSTRACT

A projection device including a light source, a reflective spatial polarization modulator, a polarization grating, and a projection lens is provided. The light source is configured to provide a light beam. The reflective spatial polarization modulator is disposed on a path of the light beam and configured to reflect the light beam and modulate a polarization state of the light beam. The polarization grating is disposed on the path of the light beam between the light source and the reflective spatial polarization modulator, wherein the reflective spatial polarization modulator reflects the light beam from the reflective spatial polarization modulator back to the polarization grating. The projection lens is disposed on the path of the light beam from the reflective spatial polarization modulator, wherein the polarization grating is disposed on the path of the light beam between the reflective spatial polarization modulator and the projection lens.

12 Claims, 6 Drawing Sheets

(56) References Cited

U.S. PATENT DOCUMENTS

| | | | | |
|---|---|---|---|---|
| 2011/0242461 A1* | 10/2011 | Escuti | ............... | G02F 1/133504 |
| | | | | 349/96 |
| 2012/0086903 A1* | 4/2012 | Escuti | ................ | G02B 5/1833 |
| | | | | 349/201 |
| 2012/0256879 A1 | 10/2012 | Liu et al. | | |
| 2013/0107173 A1* | 5/2013 | Takeda | .................... | G02B 5/23 |
| | | | | 349/96 |
| 2014/0253849 A1* | 9/2014 | Poon | .................... | G02B 27/102 |
| | | | | 349/97 |
| 2015/0168210 A1* | 6/2015 | Dorschner | ........... | G01J 1/0429 |
| | | | | 349/18 |

FOREIGN PATENT DOCUMENTS

| | | |
|---|---|---|
| CN | 101846811 | 9/2010 |
| CN | 102246089 | 11/2011 |
| JP | 2000310751 | 11/2000 |
| TW | 200946958 | 11/2009 |
| TW | M439819 | 10/2012 |
| TW | M446346 | 2/2013 |
| WO | 2013062932 | 5/2013 |

OTHER PUBLICATIONS

"Office Action of China Counterpart Application," issued on Sep. 12, 2016, p. 1-p. 8.

\* cited by examiner

PROJECTION DEVICE AND FABRICATION METHOD OF A POLARIZATION GRATING

BACKGROUND OF THE INVENTION

1. Field of the Invention

The invention generally relates to a display device and a fabrication method thereof and, in particular, to a projection device and a fabrication method thereof.

2. Description of Related Art

In the area of display technology, when a large display frame is required, a flat panel display needs to have a commensurate size. However, a projection device with a smaller size can form a large display frame on a screen. As a result, a projection device has advantage in the occasion where a number of people watch the display frame together, such as conference, briefing or movie watching. Therefore, the projection device has an irreplaceable status in the area of display technology.

In a conventional liquid-crystal-on-silicon (LCOS) projector, an unpolarized beam is polarized and then travels to an LCOS panel. The LCOS panel reflects the polarized beam and modulates the polarization state of the polarized beam. A polarizing beam splitter then blocks part of the polarized beam having a polarization direction and traveling from the LCOS panel and allows another part of the polarized beam having another perpendicular polarization direction to travel to a projection lens. When the unpolarized beam is polarized and passes through the polarizing beam splitter, the optical efficiency of the LCOS projector is considerably reduced. For a conventional color filter LCOS projector, its optical efficiency is about 3-4%.

SUMMARY OF THE INVENTION

Accordingly, the invention is directed to a projection device, which has higher optical efficiency.

The invention is directed to a fabrication method of a polarization grating, which can fabricate a polarization grating with good quality.

According to an embodiment of the invention, a projection device including a light source, a reflective spatial polarization modulator, a polarization grating, and a projection lens is provided. The light source is configured to provide a light beam. The reflective spatial polarization modulator is disposed on a path of the light beam and configured to reflect the light beam and modulate a polarization state of the light beam. The polarization grating is disposed on the path of the light beam between the light source and the reflective spatial polarization modulator, wherein the reflective spatial polarization modulator reflects the light beam from the reflective spatial polarization modulator back to the polarization grating. The projection lens is disposed on the path of the light beam from the reflective spatial polarization modulator, wherein the polarization grating is disposed on the path of the light beam between the reflective spatial polarization modulator and the projection lens.

According to an embodiment of the invention, a fabrication method of a polarization gating is provided. The method includes providing a polarization-sensitive material; and causing two orthogonally polarized lights to scan the polarization-sensitive material and to meet on the polarization-sensitive material.

In view of the above, the projection device according to the embodiment of the invention adopts the polarization grating to diffract the light beam from the light source, and the light energy transferred to the projection lens can be concentrated on the light beam with a certain diffracted order. As a result, the optical efficiency of the projection device is good, so that the projection device can provide an image frame with high brightness. In addition, in the fabrication method of the polarization grating, the polarization-sensitive material is processed by light but not by contacting the polarization-sensitive material with alignment layers. Consequently, the contact problem with the alignment layers can be prevented. Therefore, the fabrication method of the polarization grating is simple and can fabricate a polarization grating with good quality.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1A:
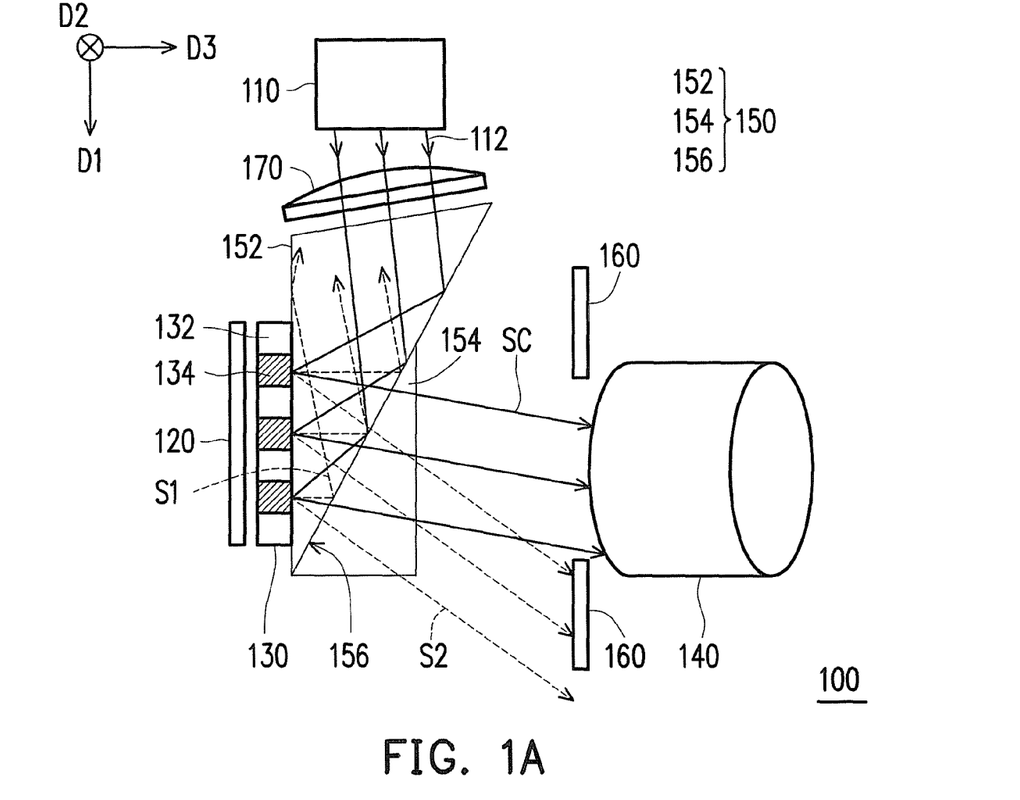
FIG. 1A is a schematic view of a projection device according to an embodiment of the invention.
Figure 1B:
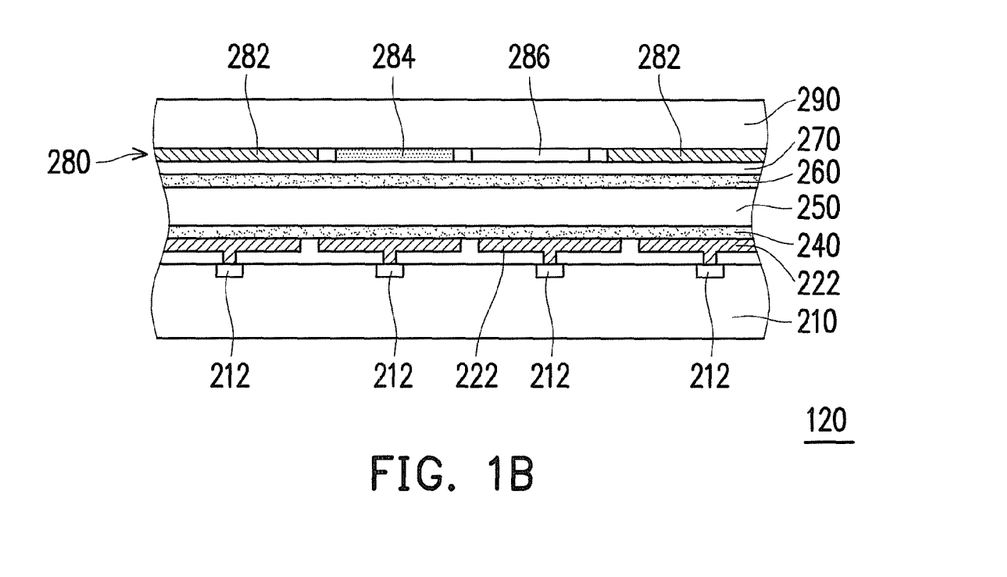
FIG. 1B is a schematic cross-sectional view of the reflective spatial polarization modulator in FIG. 1A.
Figure 1C:
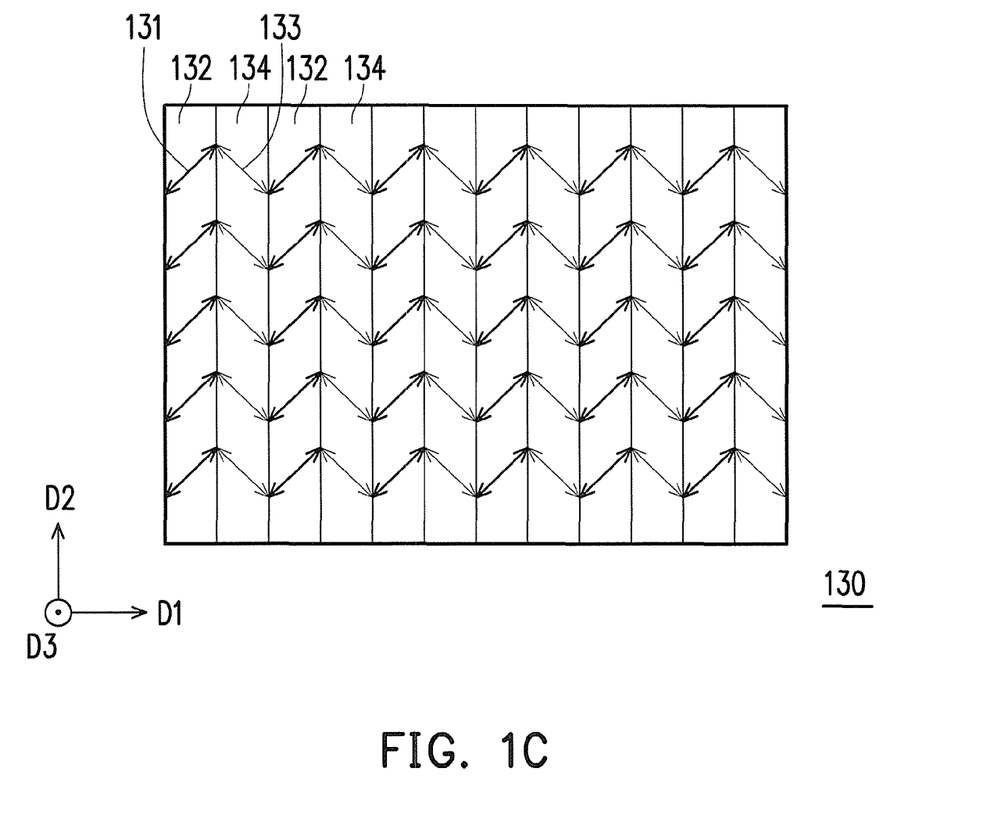
FIG. 1C is the schematic top view of the polarization grating in FIG. 1A.

FIG. 1A is a schematic view of a projection device according to an embodiment of the invention, FIG. 1B is a schematic cross-sectional view of the reflective spatial polarization modulator in FIG. 1A, and FIG. 1C is the schematic top view of the polarization grating in FIG. 1A. Referring to FIGS. 1A to 1C, the projection device 100 in this embodiment includes a light source 110, a reflective spatial polarization modulator 120, a polarization grating 130, and a projection lens 140 is provided. The light source 110 is configured to provide a light beam 112. In this embodiment, the light beam 112 is a white beam, and the light source 110 includes at least one white light-emitting diode (LED) emitting the white beam. However, in other embodiments, the light source 110 may be an ultra-high-pressure (UHP) lamp emitting a white beam. Alternatively, the light beam 112 may include a plurality of sub-beams of different colors, and the different colors mix to form white. For example, the light beam 112 may include red, green, and blue sub-beams, and the three sub-beams mix to form a white beam. Moreover, the light source 110 may include a plurality of LEDs of different colors, and the sub-beams of different colors may be emitted from LEDs of different colors, respectively. In one embodiment, the sub-beams of different colors are simultaneously emitted from the light source 110. However, in another embodiment, the sub-beams of different colors are emitted from the light source 110 by turns. In another embodiment, the light source 110 may include at least one laser emitter, for example, at least one laser diode.

The reflective spatial polarization modulator 120 is disposed on a path of the light beam 112 and configured to reflect the light beam 112 and modulate a polarization state of the light beam 112. The reflective spatial polarization modulator 120 may be a liquid-crystal-on-silicon (LCOS) panel. In this embodiment, the reflective spatial polarization modulator 120 is a color filter LCOS panel. Specifically, in this embodiment, the color filter LCOS panel includes a silicon substrate 210, a plurality of pixel electrodes 222, an insulation layer 230, an alignment layer 240, a liquid crystal layer 250, an alignment layer 260, a transparent conductive layer 270, a color filter array 280, and a transparent substrate 290. A plurality of transistors 212 are arranged on the silicon substrate 210 in an array. The transistors 212 may be electrically coupled to a plurality of scan lines and a plurality of data lines on the silicon substrate 210. The pixel electrodes 222 are electrically coupled to and cover the transistors 212, respectively. The pixel electrodes 222 are made of metal, for example, aluminum. The insulation layer 230 separates the pixel electrodes 222. The alignment layer 240 covers the pixel electrodes 222. The color filter array 280 is disposed on the transparent substrate 290. The transparent substrate 290 may be made of glass or any other appropriate transparent material. The color filter array 280 includes a plurality of color filters with different colors. For example, the color filter array 280 includes a plurality of red filters 282, a plurality of green filters 284, and a plurality of blue filters 286 arranged in an array. The transparent conductive layer 270 covers the color filter array 280, and the alignment layer 260 covers the transparent conductive layer 270. The transparent conductive layer 270 is, for example, made of indium tin oxide (ITO). The liquid crystal layer 250 is filled between the alignment layer 240 and the alignment layer 260.

In this embodiment, the color filter array 280 is disposed between the alignment layer 260 and the transparent substrate 290, but the invention is not limited thereto. In other embodiments, the color filter array 280 is disposed between the pixel electrodes 222 and the alignment layer 240 or may be disposed at any other appropriate position.

In another embodiment, the color filter array 280 may not be adopted; that is, there is no color filter array 280 between the transparent conductive layer 270 and the transparent substrate 290.

The polarization grating 130 is disposed on the path of the light beam 112 between the light source 110 and the reflective spatial polarization modulator 120, and the reflective spatial polarization modulator 120 reflects the light beam 112 from the reflective spatial polarization modulator 120 back to the polarization grating 130. The projection lens 140 is disposed on the path of the light beam 112 from the reflective spatial polarization modulator 120, and the polarization grating 130 is disposed on the path of the light beam 112 between the reflective spatial polarization modulator 120 and the projection lens 140. The light beam 112 from the polarization grating 130 passes through the transparent substrate 290, the color filter array 280, the transparent conductive layer 270, the alignment layer 260, the liquid crystal layer 250, and the alignment layer 240 in sequence to reach the pixel electrodes 222. The light beam 122 is then reflected by the pixel electrode 222 and then passes through the alignment layer 240, the liquid crystal layer 250, the alignment layer 260, the transparent conductive layer 270, the color filter array 280, and the transparent substrate 290 in sequence to reach the projection lens 140.

In this embodiment, the polarization grating 130 includes a plurality of first phase retardation strips 132 and a plurality of second phase retardation strips 134 arranged alternately in a first direction D1. Each of the first phase retardation strips 132 extends along a second direction D2, and each of the second phase retardation strips 134 extends along the second direction D2. In this embodiment, the first direction D1 and the second direction D2 are perpendicular a third direction D3, the third direction D3 is parallel to the normal of the polarization grating 130, and the first direction D1 is perpendicular to the second direction D2. The slow axis 131 of the first phase retardation strips 132 is perpendicular to the slow axis 133 of the second phase retardation strips 134. The slow axes 131 and 133 of the first phase retardation strips 132 and the second phase retardation strips 134 may be the extraordinary axes of the first phase retardation strips 132 and the second phase retardation strips 134, or may be the ordinary axes of the first phase retardation strips 132 and the second phase retardation strips 134. In this embodiment, the first phase retardation strips 132 and the second retardation strips 134 are periodically arranged along the first direction D1.

In this embodiment, the light beam 112 emitted from the light source 110 before traveling to the polarization grating 130 is an unpolarized beam. The polarization grating 130 is diffracted by the polarization grating 130 mainly into a $+1^{st}$ diffracted order sub-beam and a $-1^{st}$ diffracted order sub-beam. When the polarization grating 130 is well-designed, the intensity of the $0^{th}$ diffracted order sub-beam is much less than that of the $+1^{st}$ diffracted order sub-beam and much less than that of the $-1^{st}$ diffracted order sub-beam. Therefore, the $0^{th}$ diffracted order sub-beam can be neglected.

The case in which the light beam 112 is normally incident on the polarization grating 130 is first described as follows. The $+1^{st}$ diffracted order sub-beam may be clockwise circularly polarized sub-beam and have a diffracted angle of $+\theta$ with respect to the normal of the polarization grating 130. The $-1^{st}$ diffracted order sub-beam may be counter-clockwise circularly polarized sub-beam and have a diffracted angle of $-\theta$ with respect to the normal of the polarization grating 130. When any pixel of the reflective spatial polarization modulator 120 is in a state like a mirror plus a transparent layer, i.e. a 0 wavelength retarder, the $+1^{st}$ diffracted order sub-beam is reflected by the pixel along a direction inclined with respect to the normal of the polarization grating 130 by the angle of $+\theta$ and maintains the clockwise circular polarization. Next, the $+1^{st}$ diffracted order sub-beam is diffracted by the polarization grating 130 along a direction inclined with respected to the normal of the polarization grating 130 by an angle of $+2\theta$ and maintains the clockwise circular polarization, and is called "first side diffraction sub-beam S1" hereinafter. Moreover, the $-1^{st}$ diffracted order sub-beam is reflected by the pixel along a direction inclined with respect to the normal of the polarization grating 130 by the angle of $-\theta$ and maintains the clockwise circular polarization. Next, the $-1^{st}$ diffracted order sub-beam is diffracted by the polarization grating 130 along a direction inclined with respected to the normal of the polarization grating 130 by an angle of −2θ and maintains the counter-clockwise circular polarization, and is called "second side diffraction sub-beam S2 hereinafter". On the other hand, when any pixel of the reflective spatial polarization modulator 120 is in a state like a mirror plus a quarter wave plate, the +1$^{st}$ diffracted order sub-beam is reflected by the pixel along a direction inclined with respect to the normal of the polarization grating 130 by the angle of +θ and has a polarization state changed to the counter-clockwise circular polarization, and the −1$^{st}$ diffracted order sub-beam is reflected by the pixel along a direction inclined with respect to the normal of the polarization grating 130 by the angle of −θ and has a polarization state changed to the clockwise circular polarization. Next, the +1$^{st}$ diffracted order sub-beam and the −1$^{st}$ diffracted order sub-beam are diffracted by the polarization grating 130 along the normal of the polarization, and are combined into a central diffraction sub-beam SC.

In this embodiment, the light beam 112 is obliquely incident on the polarization grating 130, so that the first side diffraction sub-beam S1, the second side diffraction sub-beam S2, and the central diffraction sub-beam SC are respectively inclined with respect to those in the above case. Moreover, in this embodiment, the central diffraction sub-beam SC serves as an image beam and enters the projection lens 140, but the first side diffraction sub-beam S1 and the second side diffraction sub-beam S2 does not travels to the projection lens 140. The projection lens 140 projects the central diffraction sub-beam SC, i.e. the image beam, onto a screen to form an image frame on the screen.

In this embodiment, the projection device 100 further includes a total internal reflection (TIR) prism 150 disposed on the path of the light beam 112 between the light source 110 and the polarization grating 132 and on the path of the light beam 112 between the polarization grating 132 and the projection lens 140. The TIR prism 150 may include two prisms 152 and 154. The prism 152 leans against the prism 154 and has a total internal reflection surface (TIR surface) 156 facing the prism 154. The TIR surface 156 totally reflects the light beam 112 from the light source 110 to the polarization grating 130, and allows the central diffraction sub-beam SC to pass through and then to travel to the projection lens 140. In this embodiment, the projection device 100 may further includes at least one lens 170 disposed on the path of the light beam 112 between the prism 152 and the light source 110 to condense the light beam 112.

In this embodiment, the projection device 100 further includes a light shield 160 disposed on the path of the light beam 112 reflected from the reflective spatial polarization modulator 120 and diffracted by the polarization grating 130. The light shield 160 is configured to block the diffracted light beam 112 with part of diffracted orders (e.g. the first and second side diffraction sub-beams S1 and S2) from traveling to the projection lens 140 and allow the diffracted light beam 112 with another part of diffracted orders (e.g. the central diffraction sub-beam SC) to travel to the projection lens 140.

In another embodiment, the light shield 160 may not be adopted, and the projection lens 140 has an aperture stop with a smaller aperture diameter, so that the central diffraction sub-beam SC can pass through the projection lens 140, but the side diffraction sub-beams S1 and S2 cannot. Alternatively, in another embodiment, the side diffraction sub-beam S1 may be totally reflected by the TIR surface 156 and thus cannot travel to the projection lens 140, and the included angle between the side diffraction sub-beam S2 and the normal of the polarization grating 130 is large enough so that the side diffraction sub-beam deviates from the projection lens 140.

The projection device 100 in this embodiment adopts the polarization grating 130 to diffract the light beam 112 from the light source 110, and the light energy transferred to the projection lens 140 can be concentrated on the light beam 112 with a certain diffracted order (e.g. the central diffraction sub-beam). As a result, a polarizing beam splitter (PBS), which reduces the optical efficiency, can be not adopted. Therefore, the optical efficiency of the projection device 100 is good, so that the projection device 100 can provide an image frame with high brightness.

Figure 2:
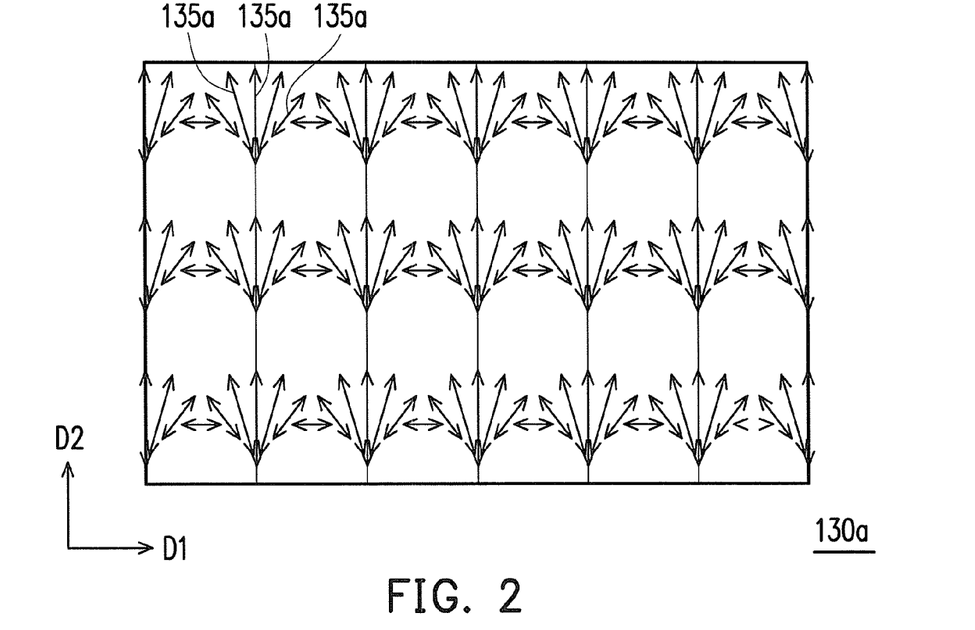
FIG. 2 is a schematic top view of a polarization grating according to another embodiment of the invention.

FIG. 2 is a schematic top view of a polarization grating according to another embodiment of the invention. Referring to FIG. 2, the polarization grating 130a in this embodiment may replace the polarization grating 130 in FIG. 1A to form another embodiment of the projection device. In this embodiment, the polarization grating 130 has a slow axis 135a rotationally varied along the first direction D1 periodically and not varied along the second direction D2.

Figure 3:
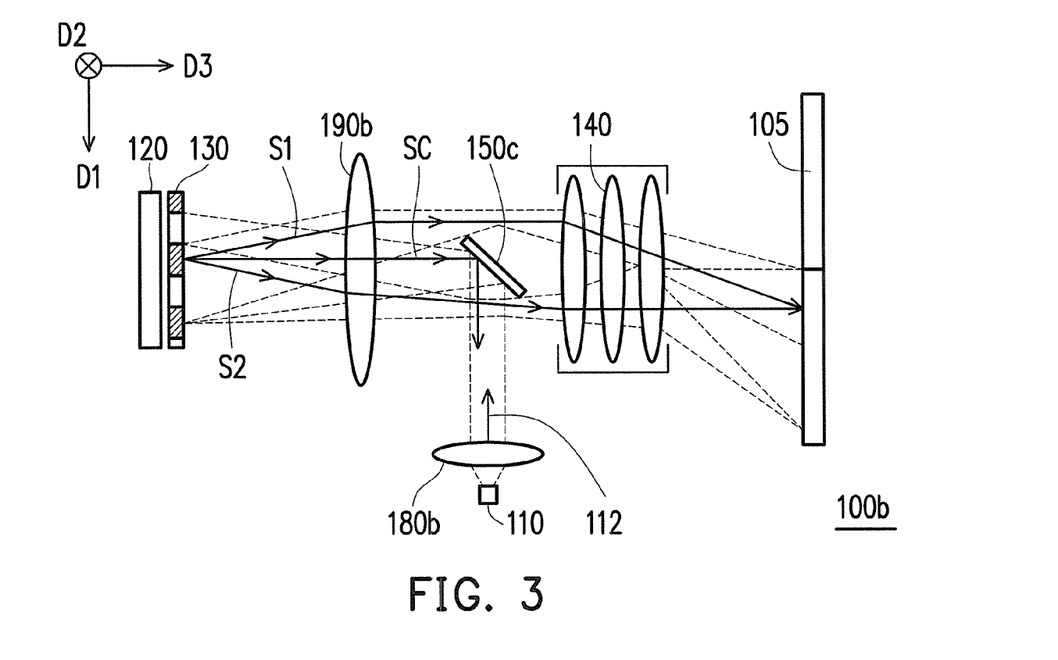
FIG. 3 is a schematic view of a projection device according to another embodiment of the invention.

FIG. 3 is a schematic view of a projection device according to another embodiment of the invention. Referring to FIG. 3, the projection device 100b in this embodiment is similar to the projection device 100 in FIG. 1A, and the difference therebetween is as follows. In the projection device 100b, a reflector 150c is adopted to replace the TIR prism 150. The reflector 150c is disposed on the path of the light beam 112 between the light source 110 and the polarization grating 130. The reflector 150c blocks the diffracted light beam 112 with part of diffracted orders (e.g. the central diffraction sub-beam SC) from traveling to the projection lens 140. In this embodiment, the reflector 150c reflects the central diffraction sub-beam SC, so as to cause the central diffraction sub-beam SC not to travel to the projection lens 140. Moreover, the reflector 150c allows the diffracted light beam 112 with another part of diffracted orders (e.g. the first and second side diffraction sub-beams 112 and 114) to travel to the projection lens 140. This is because the first and second side diffraction sub-beams 112 and 114 from the polarization grating 130 does not blocked by the reflector 150c. In this embodiment, the reflector 150c is a mirror. However, in other embodiments, the reflector 150c may be a reflective prism. Then, the first and second side diffraction sub-beams 112 and 114 are projected onto a screen 105.

Figure 4A:
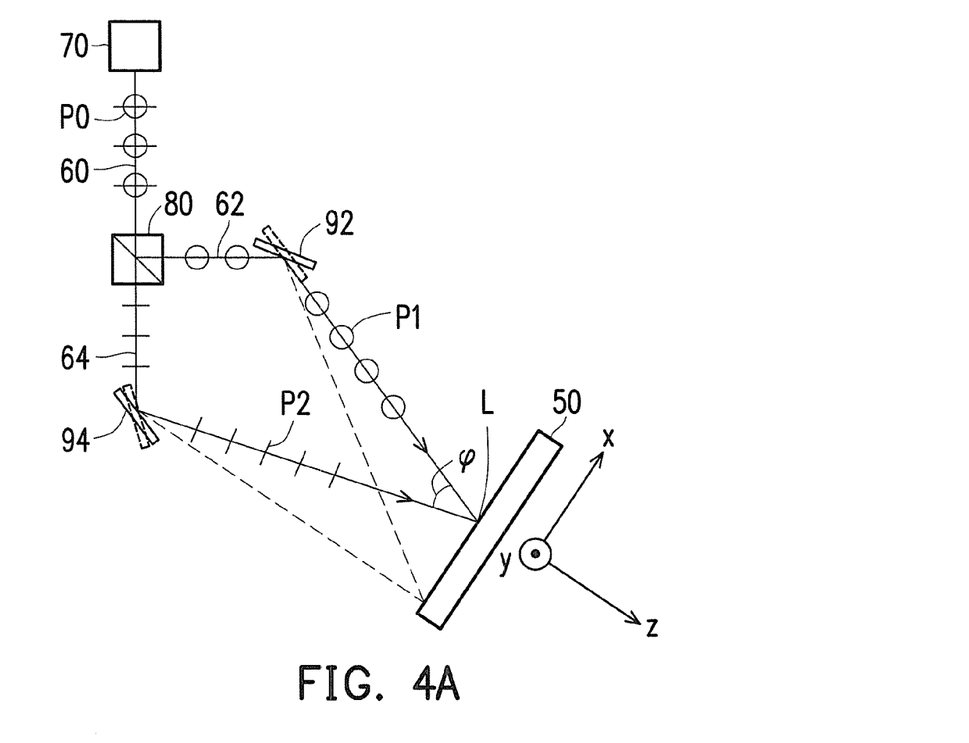
FIG. 4A is a schematic view illustrating a fabrication method of a polarization grating.
Figure 4B:
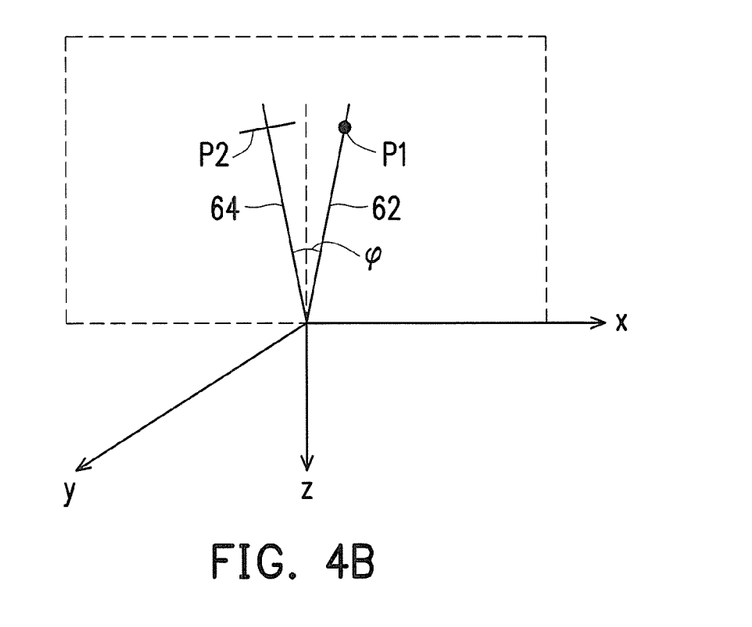
FIG. 4B is a schematic diagram showing the coordinate and the position of the lights in FIG. 4A irradiating the polarization-sensitive material in FIG. 4A.
Figure 4C:
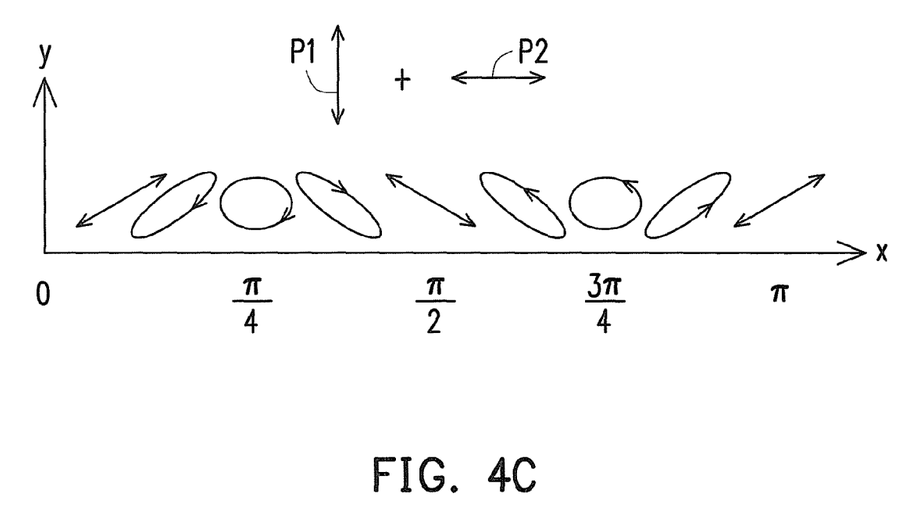
FIG. 4C is a schematic diagram showing the combined polarization state of the two lights of FIG. 4A when the two lights meet on the polarization-sensitive material in FIG. 4A.

FIG. 4A is a schematic view illustrating a fabrication method of a polarization grating, FIG. 4B is a schematic diagram showing the coordinate and the position of the lights in FIG. 4A irradiating the polarization-sensitive material in FIG. 4A, and FIG. 4C is a schematic diagram showing the combined polarization state of the two lights of FIG. 4A when the two lights meet on the polarization-sensitive material in FIG. 4A. Referring to FIGS. 4A to 4C, the fabrication method of the polarization grating in this embodiment may be used to fabricate the above polarization grating 130. The fabrication method includes providing a polarization-sensitive material 50. In this embodiment, the polarization-sensitive material 50 is a liquid crystal material. Then, the fabrication method includes causing two orthogonally polarized lights 62 and 64 to scan the polarization-sensitive material 50 and to meet on the polarization-sensitive material 50.

In this embodiment, the fabrication method further includes emitting an original light 60 and splitting the original light 60 into the two orthogonally polarized lights 62 and 64. The original light 60 is, for example, a laser light. In this embodiment, a laser source 70 may be used to emit the original light 60. Moreover, in this embodiment, a polarizing beam splitter (PBS) 80 is disposed on the path of the original light 60 to split the original light 60 into two orthogonally polarized lights 62 and 64. In this embodiment, the original light 60, the light 62 and the light 64 are linearly polarized lights. The polarization direction P1 of the light 62 is perpendicular to the polarization direction P2 of the light 64. The polarization direction P0 of the original light 60 and the polarization direction P1 of the light 62 form an included angle of 45°. The polarization direction P0 of the original light 60 and the polarization direction P2 of the light 64 form an included angle of 45°. Two scanning mirrors 92 and 94 are adopted to respectively reflect the two lights 62 and 64, so as to cause the two lights 62 and 64 to meet on the polarization-sensitive material 50. In this embodiment, an included angle φ is formed between the two orthogonally polarized lights 62 and 64 and at an incident position L of the two orthogonally polarized lights 62 and 64 incident on the polarization-sensitive material 50.

When the two scanning mirrors 62 and 64 rotate, the two lights 62 and 64 scan the polarization-sensitive material 50 along a direction, for example the x direction. At this time, the difference of the optical path length between the two lights 62 and 64 is changed, so that the combined polarization state of the two lights 62 and 64 on the polarization-sensitive material 50 is changed. In FIG. 4C, the combined polarization state of the two lights 62 and 64 is varied along the x direction. The extraordinary axis of the liquid crystal molecules of the polarization-sensitive material 50 is rotated to an orientation perpendicular to the combined polarization direction. As a result, the slow axis of the polarization-sensitive material 50 is periodically changed along the x direction but not changed along the y direction. After the two lights 62 and 64 scan the polarization-sensitive material 50, the polarization-sensitive material 50 is cured to form the polarization grating 130 in FIG. 1C, wherein the x direction in FIG. 4A corresponds to the first direction D1 in FIG. 1C, the y direction in FIG. 4A corresponds to the second direction D2 in FIG. 1C, and the z direction is perpendicular to the x direction and the y direction. In FIG. 4C, there are a circular polarization state and elliptic polarization state between two adjacent orthogonal linear polarization states, so that the boundary between the adjacent first and second phase retardation strips 132 and 134 is blurry in fact.

Figure 5A:
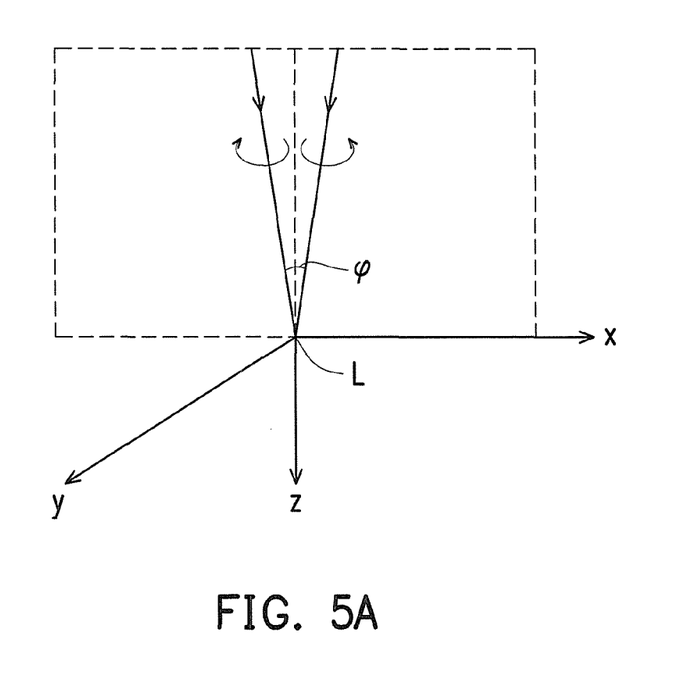
FIGS. 5A and 5B are respectively other variations of FIGS. 4B and 4C in another embodiment of the invention.
Figure 5B:
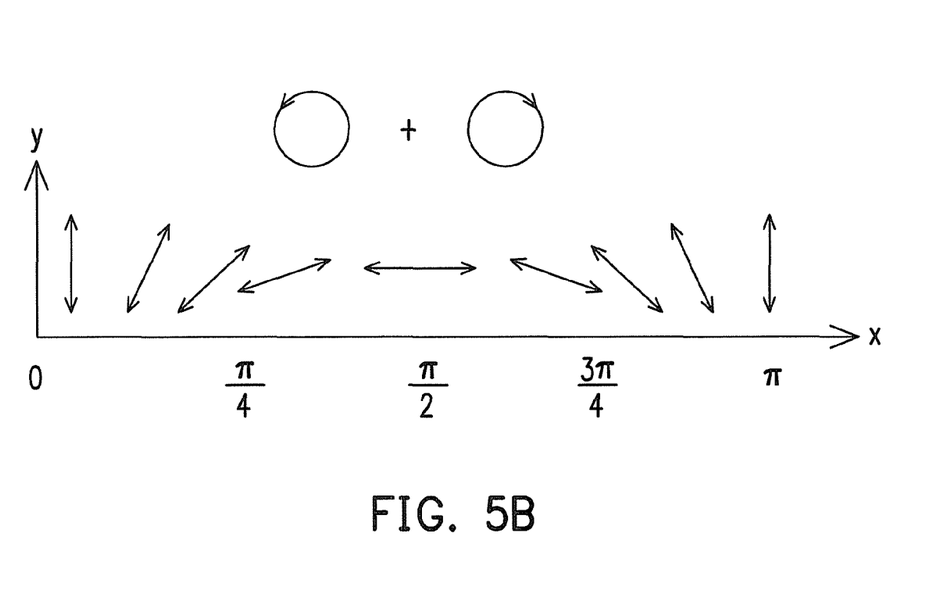

In another embodiment, referring to FIGS. 5A and 5B two quarter wave plates may be respectively disposed on the paths of the lights 92 and 94 between the PBS 80 and the polarization-sensitive material 50, so that two orthogonally circularly polarized lights meet on the polarization-sensitive material 50. For example, the lights 92 is converted into a counter-clockwise circularly polarized light before reaching the polarization-sensitive material 50, and the lights 94 is converted into a clockwise circularly polarized light before reaching the polarization-sensitive material 50. In this case, when the lights 92 and 94 scan the polarization-sensitive material 50, the combined polarization state of the lights 92 and 94 is always linear, and the linear polarization direction of the combined polarization state is rotationally varied along the x direction periodically and not varied along the y direction. As a result, after the polarization-sensitive material 50 is scanned and cured, the polarization grating 130a is formed. In still another embodiment, the lights 92 and 94 may be two orthogonal elliptically polarized lights.

In the fabrication method of the polarization grating in this embodiment, the polarization-sensitive material 50 is processed by light but not by contacting the polarization-sensitive material with alignment layers. Consequently, the contact problem (e.g. contamination) with the alignment layers can be prevented. Therefore, the fabrication method of the polarization grating is simple and can fabricate a polarization grating with good quality. Moreover, the optical path lengths of the lights 62 and 64 are easy to adjust, so that the spatial period of the polarization grating may be freely designed. Furthermore, the spatial period of the polarization grating may be smaller than the spatial period which the conventional photolithography can achieve. That is to say, the fabrication method of the polarization grating can fabricate a polarization grating with a smaller spatial period.

In conclusion, the projection device according to the embodiment of the invention adopts the polarization grating to diffract the light beam from the light source, and the light energy transferred to the projection lens can be concentrated on the light beam with a certain diffracted order. As a result, the optical efficiency of the projection device is good, so that the projection device can provide an image frame with high brightness. In addition, in the fabrication method of the polarization grating, the polarization-sensitive material is processed by light but not by contacting the polarization-sensitive material with alignment layers. Consequently, the contact problem with the alignment layers can be prevented. Therefore, the fabrication method of the polarization grating is simple and can fabricate a polarization grating with good quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A projection device comprising:
a light source configured to provide a light beam;
a reflective spatial polarization modulator disposed on a path of the light beam and configured to reflect the light beam and modulate a polarization state of the light beam;
a polarization grating disposed on the path of the light beam between the light source and the reflective spatial polarization modulator, wherein the reflective spatial polarization modulator reflects the light beam from the reflective spatial polarization modulator back to the polarization grating;
a projection lens disposed on the path of the light beam from the reflective spatial polarization modulator, wherein the polarization grating is disposed on the path of the light beam between the reflective spatial polarization modulator and the projection lens, wherein the light beam is diffracted by the polarization grating into sub-beams of a plurality of diffracted orders, and the light beam emitted from the light source before traveling to the polarization grating is an unpolarized beam, and
a reflector, disposed on a central optical axis of the reflective spatial polarization modulator, wherein the reflector is configured to shield the light beam along the central optical axis.

2. The projection device according to claim 1, wherein the reflective spatial polarization modulator is a liquid-crystal-on-silicon (LCOS) panel.

3. The projection device according to claim 2, wherein the LCOS panel is a color filter LCOS panel.

4. The projection device according to claim 3, wherein the light beam is a white beam.

5. The projection device according to claim 3, wherein the light beam comprises a plurality of sub-beams of different colors, and the different colors mix to form white.

6. The projection device according to claim 5, wherein the sub-beams of different colors are simultaneously emitted from the light source.

7. The projection device according to claim 5, wherein the sub-beams of different colors are emitted from the light source by turns.

8. The projection device according to claim 1 further comprising a light shield disposed on the path of the light beam reflected from the reflective spatial polarization modulator and diffracted by the polarization grating, and the light shield is configured to block the diffracted light beam with part of diffracted orders from traveling to the projection lens and allow the diffracted light beam with another part of diffracted orders to travel to the projection lens.

9. The projection device according to claim 1 further comprising a total internal reflection (TIR) prism disposed on the path of the light beam between the light source and the polarization grating and on the path of the light beam between the polarization grating and the projection lens.

10. The projection device according to claim 1, wherein the reflector disposed on the path of the light beam between the light source and the polarization grating, wherein the reflector blocks the diffracted light beam with part of diffracted orders from traveling to the projection lens and allows the diffracted light beam with another part of diffracted orders to travel to the projection lens.

11. The projection device according to claim 1, wherein the polarization grating comprises a plurality of first phase retardation strips and a plurality of second phase retardation strips arranged alternately in a first direction, each of the first phase retardation strips extends along a second direction, each of the second phase retardation strips extends along the second direction, and a slow axis of the first phase retardation strips is perpendicular to that of the second phase retardation strips.

12. The projection device according to claim 1, wherein the polarization grating has a slow axis rotationally varied along a first direction periodically and not varied along a second direction.

* * * * *